United States Patent [19]
Goulet

[11] 4,036,054
[45] July 19, 1977

[54] FLUID PRESSURE SENSING APPARATUS
[75] Inventor: Roger T. Goulet, Liverpool, N.Y.
[73] Assignee: Cambridge Filter Corporation, Syracuse, N.Y.
[21] Appl. No.: 668,234
[22] Filed: Mar. 18, 1976
[51] Int. Cl.² ............................................. G01F 1/46
[52] U.S. Cl. ...................................... 73/212; 73/182; 73/420
[58] Field of Search ............ 73/212, 182, 147, 205 L, 73/420

[56] References Cited
U.S. PATENT DOCUMENTS

| 2,101,858 | 12/1937 | Knisley | 73/212 |
|---|---|---|---|
| 3,685,355 | 8/1972 | De Baun | 73/212 |
| 3,733,900 | 5/1973 | De Baun | 73/212 |

*Primary Examiner*—Donald O. Woodiel
*Attorney, Agent, or Firm*—Charles S. McGuire

[57] ABSTRACT

Apparatus for sensing the total pressure of a fluid flowing through a duct by a plurality of open-ended impact tubes fixedly arranged in a transverse plane of the duct and connected to a common manifold tube. Flow straightening means upstream of each sensing tube are provided by individual straightener tubes, open at both ends and arranged axially in the direction of fluid flow, in association with each sensing tube. The straightener tubes extend upstream from the ends of the impact tubes by a distance equal to at least eight times the transverse dimension of the straightener tube. In the preferred embodiment, separately manifolded static pressure sensing tubes are also provided, and serve as support means for the straightener tubes.

12 Claims, 4 Drawing Figures

FLUID PRESSURE SENSING APPARATUS

BACKGROUND OF THE INVENTION

The present invention relates to apparatus for sensing the total pressure of a moving fluid, and more particularly to such apparatus having improved means for removing turbulence from the fluid prior to impact thereof with the sensing means.

Many forms of apparatus have been provided for sensing and measuring the pressure of fluids flowing through enclosed ducts or conduits. It is generally necessary to provide some means upstream of the sensing location for minimizing turbulence in order to insure reliable readings, particularly in the case of total pressure measurement. In the case of air flow measurement, the most common straightener means employed in the prior art is a honeycomb structure or other such vanes having surfaces extending in the direction of air flow and arranged across the interior of the duct or conduit a suitable distance upstream from the sensor locations. Thus, the fluid is flowing essentially parallel to the axis of the duct as it reaches the sensors.

While prior art straightener means of the afore-mentioned type serve to remove turbulence from the flow in a satisfactory manner, their presence results in a significant drop in static pressure due to the added resistance to flow. This pressure drop is, of course, undesirable in virtually all applications since it is accompanied by a loss of energy in the fluid flow. Among the most common applications of the invention is the measurement of air flow in heating, ventilating and air conditioning systems. Typical examples of equipment used in such applications, including references to prior art flow straightener means, are found in applicant's copending U.S. application Ser. No. 580,153.

It is a principal object of the present invention to provide fluid pressure measurement apparatus having improved flow straightener means upstream of fixed sensor locations.

A further object is to provide flow straightener means which produce minimal loss in static pressure.

Another object is to provide apparatus for measuring both total and static pressure by a plurality of sensing probes fixedly positioned in a transverse plane of the duct carrying the fluid wherein means for straightening the flow of fluid prior to reaching the total pressure probes are supported by the static pressure probes.

Other objects will in part be obvious and will in part appear hereinafter.

SUMMARY OF THE INVENTION

In accordance with the foregoing objects, the apparatus includes a plurality of total-pressure sensing probes in the form of impact tubes each having one end open to receive fluid flow and the other end connected to a common manifold wherein the pressures at each sensor location are averaged. Static pressure is also sensed at a plurality of points by sensing tubes closed at the ends directed toward fluid flow and having openings through a side wall. The static pressure sensing probes are also connected to a common manifold for obtaining an average static pressure reading across the transverse plane of the duct.

Associated with each of the total pressure sensing probes are individual tubes through which the fluid flows prior to reaching the open ends of the impact tubes. Turbulence is thus essentially absent from the flow at the points where total pressure is sensed. The individual flow straightener tubes are open at both ends, arranged axially of the duct or conduit through which the fluid travels, and of a diameter significantly larger than the impact tubes. The open ends of the impact tubes are positioned substantially at the center of the straightener tubes at the downstream end thereof. The straightener tubes preferably extend upstream from the open end of the impact tubes by at least eight times the straightener tube diameter in order to insure the required degree of turbulence removal.

In the preferred embodiment, a second plurality of probes extend in the upstream direction from a separate manifold to which static pressure within the duct is communicated. The static pressure probes are rigidly attached to and support the aforementioned flow straightener tubes. Static pressure is communicated through small openings through the wall of the straightener tubes to the interior of the probes and thence to the static pressure manifold. Flow velocity may be conventionally ascertained from the difference between the total and static pressures.

BRIEF DESCRIPTION OF THE DRAWINGS

FIG. 1 is a perspective view of apparatus embodying the invention, suitable for incorporation in an air flow duct, or the like;

DETAILED DESCRIPTION

Figure 1:
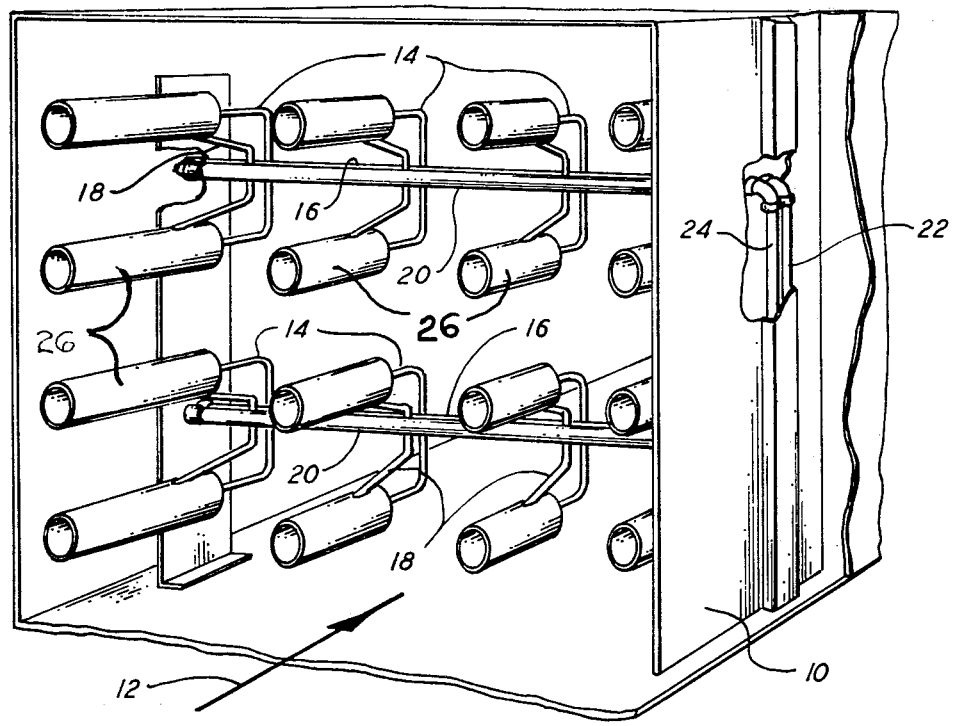

The pressure sensing apparatus of the invention is shown in FIG. 1 mounted in a square or rectangular wall section 10 which may comprise a portion of, or be mounted at a selected location in, a heating or ventilating duct, or similar structure for carrying a flowing fluid. In the most common applications, the apparatus is used in the measurement of the velocity or rate of air flow, and wall section 10 is installed in an existing air duct of the same cross section by replacing a section of the duct removed for such purpose with wall section 10. The apparatus is installed with the direction of air flow through the duct indicated by arrow 12.

The preferred embodiment, as seen in FIG. 1, includes means for sensing both the total and the static pressure of fluid as it flows through wall section 10. Both total and static pressure are sensed at a plurality of points located substantially at the centers of segments of equal area of a transverse plane of the wall section. Total pressure is sensed through open ended impact tubes in the form of U-shaped tubes 14, each of which communicates with one of a pair of total pressure manifolds 16. Static pressure is likewise sensed through U-shaped tubes 18, communicating with static pressure manifolds 20. The total pressure within manifolds 16 is communicated to cross manifold 22 and the static pressure from manifolds 20 to cross manifold 24. Appropriate fittings extend from each of cross manifolds 22 and 24 through openings in one side of wall section 10. A conventional differential pressure measuring instrument (not shown), such as an inclined manometer, may be connected to the two fittings.

Figure 2:
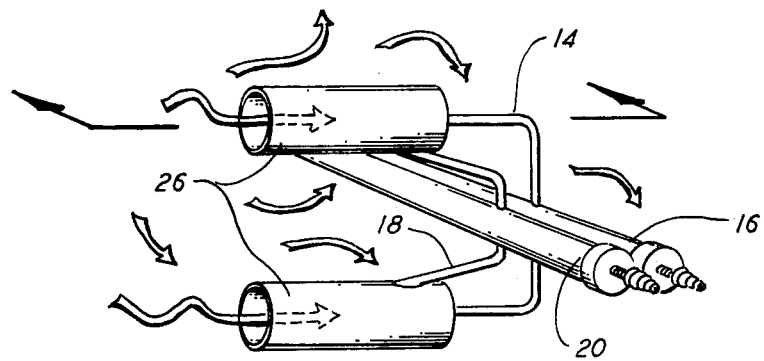
FIG. 2 is a fragmentary, perspective view of a portion of the apparatus of FIG. 1.
Figure 3:
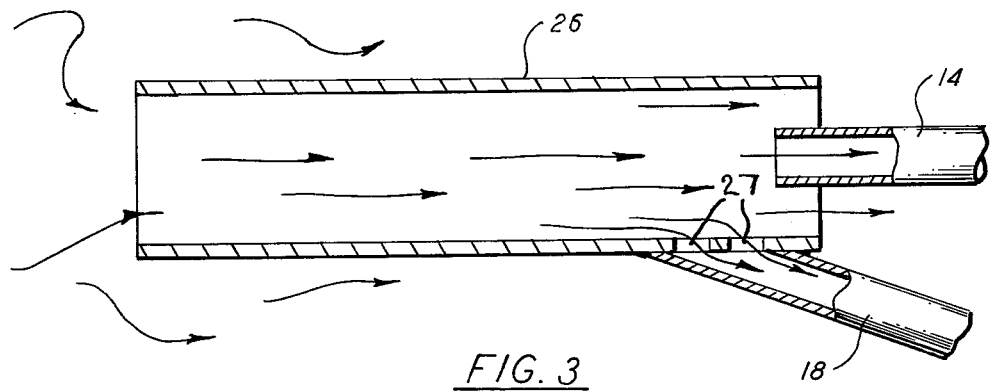
FIG. 3 is a fragmentary, side elevational view taken generally on the line 3—3 of FIG. 2.
Figure 4:
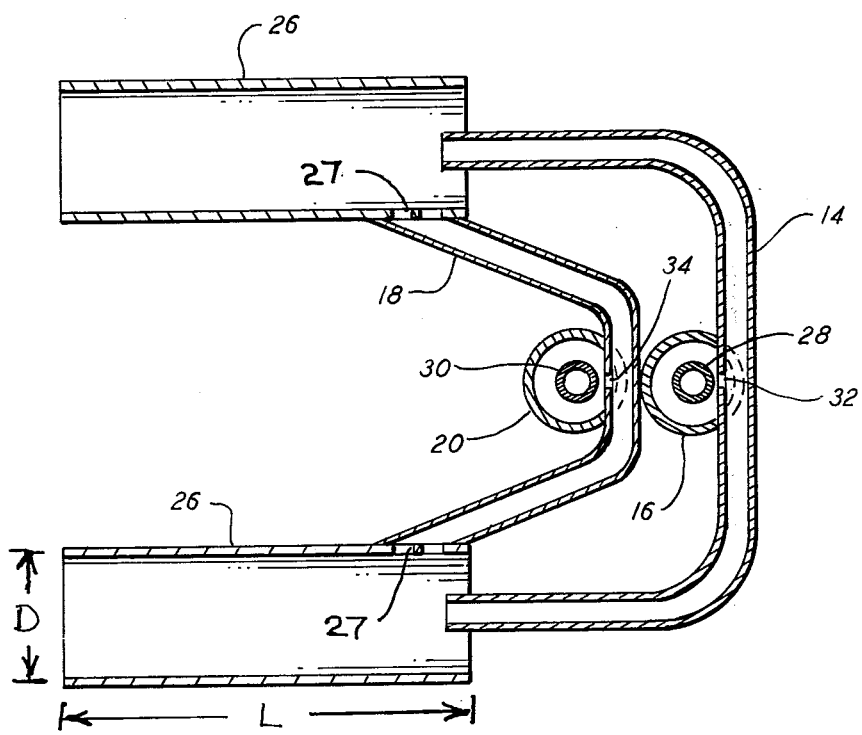
FIG. 4 is a side elevational view in full section of the portions of the apparatus shown in FIG. 2.

Turning now to FIGS. 2-4, the two legs of each of U-shaped tubes 14 are seen to extend substantially parallel to one another and to duct axis. While the major direction of air flow through the duct is parallel to the duct axis, in actual practice, a certain amount of turbulence will be present, as indicated by the arrows in FIG. 2. The legs of each of U-shaped tubes 18 diverge and support at each end one of air flow straightener tubes 26 by fixed attachment the ends of tubes 18 and the outside walls of tubes 26. Static pressure of the air in straightener tubes 26 is communicated through openings 27 to the interior of static sensing tubes 18. Openings 27 extend through the walls of tubes 26 in a direction laterally of air flow through tubes 26.

Sensing tubes 28 and 30 (FIG. 4) are coaxially supported within manifold tubes 16 and 20, respectively, and include openings (not shown) at one or more points along their length to provide communication between the interiors of the manifold and sensing tubes. Tubes 14 and 18 communicate through small openings 32 and 34, respectively, with the interiors of manifold tubes 16 and 20. The structure and operation of the manifold and sensing tubes in combination with the U-shaped probes are the same as in the more detailed description of the same elements found in U.S. application Ser. No. 580,152 of Carl J. Bauder, filed May 23, 1975 and assigned to applicant's assignee.

The open ends of the impact probes at each extremity of U-shaped tubes 14 are positioned at the transverse center of the associated straightener tubes 26, substantially in the plane of or extending slightly into the downstream end thereof. As previously mentioned, it it preferable for maximum unit accuracy that the sensor tips be positioned at the centers of segments, preferably squares, of equal area of the transverse plane of the duct at which the tips are located. Measurement integrity of 100% is maintained by providing one static pressure sensing point for each total pressure sensing point, each pair of sensing points being located closely adjacent one another. Although the length of the straightener tubes in the upstream direction from the total pressure tube sensing tips required to provide the necessary degree of air flow straightening may vary somewhat for different installations, in typical cases a length at least equal to eight times the straightener tube diameter is adequate. That is, with reference to FIG. 4 of the drawings, the dimension indicated by the letter L should be at least eight times the dimension indicated by the letter D.

Thus, there has been described a fluid pressure sensing and measuring system wherein highly accurate readings are obtained while eliminating the need for a separate honeycomb flow straightening section as conventionally provided in air flow measuring devices. The single flow straightener tube provided in association with each total pressure sensing probe produces very low resistance to air flow, particularly in comparison to the aforementioned honeycomb air flow straighteners. Therefore, significant power savings are realized since there is less decrease in energy which must be compensated for by increasing the driving force applied.

What is claimed is:

1. Apparatus for measuring pressure in an enclosed duct through which a fluid is flowing in a known direction, said apparatus comprising in combination:
   a. a plurality of hollow total pressure sensing tubes fixedly supported within the duct and having open ends directed oppositely to the direction of fluid flow;
   b. a plurality of hollow air flow straighten tubes open at both ends and supported within the duct and extending longitudinally along the axis thereof; and
   c. each of said sensing tubes being arranged with said open ends thereof positioned within one of said straightener tubes, the length of said straightener tubes in the upstream direction from said open end of the associated total pressure sensing tube being equal to at least approximately eight times the largest internal lateral dimension of said straightener tubes.

2. The invention according to claim 1 wherein said open ends of said total pressure sensing tubes are positioned substantially at the transverse center of said straightener tubes.

3. The invention according to claim 1 wherein said open ends of said total pressure sensing tubes are positioned in a single transverse plane of the duct, substantially at the center of segments of equal area of said plane.

4. The invention according to claim 1 and further including a manifold tube with which each of said total pressure sensing tubes communicate to transmit total pressure from the duct to said manifold.

5. The invention according to claim 4 and further including a plurality of hollow static pressure sensing tubes fixedly supported within the duct and each communicating with a second hollow manifold tube to transmit static pressure from the duct to said second manifold.

6. The invention according to claim 5 wherein each of said static pressure sensing tubes extends from a connection with said second manifold to an end portion fixedly connected to and supporting one of said straightener tubes.

7. Apparatus for measuring pressure in an enclosed duct through which a fluid is flowing in a known direction, said apparatus comprising in combination:
   a. a plurality of hollow total pressure sensing tubes fixedly supported within the duct and having open ends directed oppositely to the direction of fluid flow;
   b. a plurality of hollow air flow straighten tubes open at both ends and supported within the duct and extending longitudinally along the axis thereof;
   c. a plurality of hollow static pressure sensing tubes fixedly supported within the duct and each having an end portion fixedly connected to an outer wall of one of said straightener tubes to provide the sole means of support thereof, said wall including at least one opening through which the interiors of said straightener and static pressure sensing tubes communicate.

8. The invention according to claim 7 wherein the length of said straightener tubes in the upstream direction from said open end of the associated total pressure sensing tube being equal to at least approximately eight times the largest internal lateral dimension of said straightener tubes.

9. The invention according to claim 7 wherein said open ends of said total pressure sensing tubes are positioned in a single transverse plane of the duct, substantially at the center of segments of equal area of said plane.

10. The invention according to claim 9 wherein said straightener tubes are circular in cross section and of constant diameter.

11. The invention according to claim 10 wherein the points at which static pressure is communicated from within said straightener tubes to within said static pressure sensing tubes are approximately at the center of segments of equal area of said plane.

12. The invention according to claim 11 wherein the length of said straightener tubes in the upstream direction from said open end of the associated total pressure sensing tube is equal to at least approximately eight times the largest internal lateral dimension of said straightener tubes.

* * * * *